United States Patent
Zahner

(10) Patent No.: US 6,564,509 B1
(45) Date of Patent: May 20, 2003

(54) NOTIFICATION APPARATUS FOR WATERING HOUSEPLANTS

(76) Inventor: Edward Zahner, 19 Myrtle Ave., Keansburg, NJ (US) 07734

( * ) Notice: Subject to any disclaimer, the term of this patent is extended or adjusted under 35 U.S.C. 154(b) by 0 days.

(21) Appl. No.: 10/037,708

(22) Filed: Dec. 28, 2001

Related U.S. Application Data

(60) Provisional application No. 60/258,633, filed on Dec. 29, 2000.

(51) Int. Cl.[7] ................................................ A01G 9/02
(52) U.S. Cl. ............................. 47/67; 177/233; 116/215
(58) Field of Search ............................ 47/67; 116/215, 116/200, 212, 278; 177/232, 233

(56) References Cited

U.S. PATENT DOCUMENTS

| | | | | |
|---|---|---|---|---|
| 46,592 A | * | 2/1865 | Snyder | 177/167 |
| 3,229,780 A | * | 1/1966 | Hanssen | 116/DIG. 20 |
| 3,266,175 A | * | 8/1966 | Palumbi | 177/232 |
| 3,967,578 A | | 7/1976 | Gallo | 116/296 |
| 4,078,625 A | * | 3/1978 | Loeb | 177/233 |
| 4,189,124 A | * | 2/1980 | Faris | 211/115 |
| 4,216,619 A | * | 8/1980 | Espy | 185/27 |
| 4,454,831 A | * | 6/1984 | Gallo | 116/200 |
| 4,480,465 A | * | 11/1984 | Chase | 116/200 |
| 4,574,521 A | * | 3/1986 | Landy | 47/67 |
| 4,825,591 A | * | 5/1989 | Han | 47/67 |
| 5,079,869 A | * | 1/1992 | Dawson | 248/339 |
| 5,315,784 A | | 5/1994 | Henehan | |
| 5,802,764 A | * | 9/1998 | Nucci | 47/39 |
| 5,848,494 A | | 12/1998 | Spelt | |
| 5,974,731 A | | 11/1999 | Wesolowski | |

* cited by examiner

*Primary Examiner*—Charles T. Jordan
*Assistant Examiner*—Jeffrey L. Gellner
(74) *Attorney, Agent, or Firm*—Matthew J. Peirce

(57) ABSTRACT

A new and improved apparatus is disclosed for reminding people to water a house plant. A user would hang a house plant from an eye hook located at the bottom of the bottom of the present invention, and an included readout would indicate when a user would need to water the house plant. The top half of the readout would be red and would not be visible when the houseplant would have sufficient water. The lower half of the readout would be green and would be visible through the bottom of the apparatus when the would have sufficient water. However, the top half of the readout would start to become visible through a transparent central portion of the apparatus when the houseplant would need to be watered. At the same time, the bottom half of the readout would be pulled into the apparatus and would gradually disappear as the need for water for the houseplant would increase.

4 Claims, 1 Drawing Sheet

US 6,564,509 B1

NOTIFICATION APPARATUS FOR WATERING HOUSEPLANTS

Priority is hereby claimed to application Ser. No. 60/258,633, filed on Dec. 29, 2000.

BACKGROUND OF THE INVENTION

The present invention is that of a new and improved apparatus for reminding people to water a house plant.

DESCRIPTION OF THE PRIOR ART

U.S. Pat. No. 5,974,731, issued to Wesolowski, discloses an apparatus for watering a plant while it is supported in an elevated position.

U.S. Pat. No. 5,848,494, issued to Spelt, discloses a fluid control apparatus for controlling water supply to a potted plant and a main valve responsive to weight of the potted plant.

U.S. Pat. No. 5,802,764, issued to Nucci, discloses a spring scale which is adapted to weigh containers carrying fluids.

U.S. Pat. No. 5,315,784, issued to Henehan, discloses a device for rotating a hanging plant to keep it from growing lopsided.

U.S. Pat. No. 5,079,869, issued to Dawson, discloses suspension or hanger bars, particularly a weight-responsive hanger bar which is pivotable to indicate changes in weight of the suspended object.

U.S. Pat. No. 4,454,831, issued to Gallo, discloses a watering indicator for hanging plants including two support elements.

U.S. Pat. No. 4,078,625, issued to Loeb, discloses an apparatus having a spring biased shaft which provides vertical support to a hanging plant container.

U.S. Pat. No. 3,967,578, issued to Gallo, discloses a moisture gauge for a hanging potted plant, which comprises a generally U-shaped spring element.

SUMMARY OF THE INVENTION

The present invention is that of a new and improved apparatus for reminding people to water a house plant. A user would hang a house plant from an eye hook located at the bottom of the bottom of the present invention, and an included readout would indicate when a user would need to water the house plant. The top half of the readout would be red and would not be visible when the houseplant would have sufficient water. The lower half of the readout would be green and would be visible through the bottom of the apparatus when the would have sufficient water. However, the top half of the readout would start to become visible through a transparent central portion of the apparatus when the houseplant would need to be watered. At the same time, the bottom half of the readout would be pulled into the apparatus and would gradually disappear as the need for water for the houseplant would increase.

There has thus been outlined, rather broadly, the more important features of an apparatus for reminding people to water a house plant in order that the detailed description thereof that follows may be better understood and in order that the present contribution to the art may be better appreciated. There are, of course, additional features of the apparatus for reminding people to water a house plant that will be described hereinafter and which will form the subject matter of the claims appended hereto.

In this respect, before explaining at least one embodiment of the apparatus for reminding people to water a house plant in detail, it is to be understood that the apparatus for reminding people to water a house plant is not limited in its application to the details of construction and to the arrangements of the components set forth in the following description or illustrated in the drawings. The apparatus for reminding people to water a house plant is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present apparatus for reminding people to water a house plant. It is important, therefore, that the claims be regard as including such equivalent constructions insofar as they do not depart from the spirit and scope of the present invention.

It is therefore an object of the present invention to provide an apparatus for reminding people to water a house plant which has all of the advantages of the prior art and none of the disadvantages.

It is another object of the present invention to provide an apparatus for reminding people to water a house plant which may be easily and efficiently manufactured and marketed.

It is another object of the present invention to provide an apparatus for reminding people to water a house plant which is of durable and reliable construction.

It is yet another object of the present invention to provide an apparatus for reminding people to water a house plant which is economically affordable and available for the buying public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
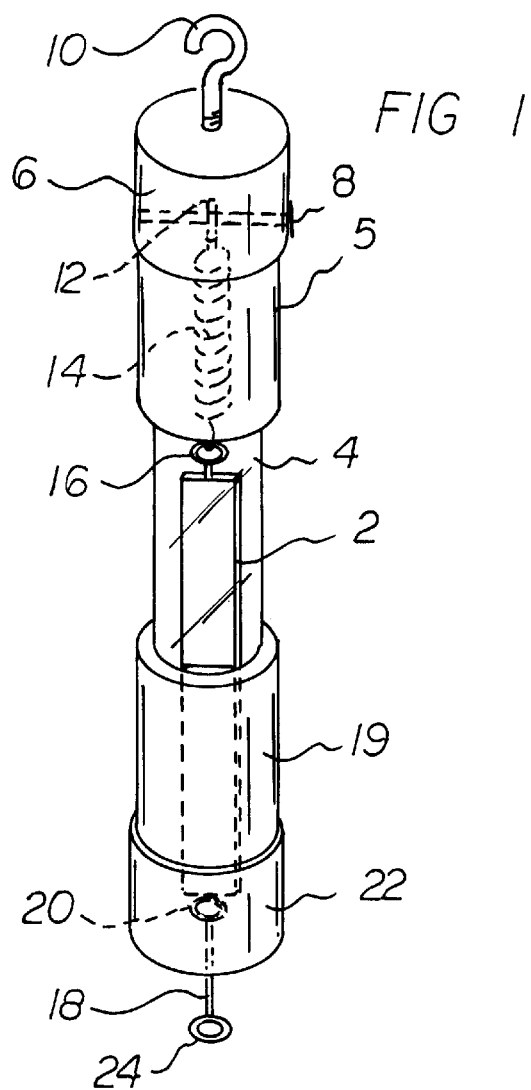
FIG. 1 shows a perspective view of the present invention.

FIG. 1 shows a perspective view of the present invention. The primary part of the present invention is the readout 2, which is located within tube 4. Readout 2 is used by a user to indicate when the appropriate time to water the house plant would be. Readout 2 would have two ends, a first end and a second end. Readout 2 would be approximately six inches long, with approximately the top three inches of readout 2 being red and approximately the bottom three inches of readout 2 being green.

Tube 4 has two ends, a first end and a second end. Housing 5 is mounted over the first couple inches of the first end of tube 4, with PVC cap 6 being mounted over the housing on first end of tube 4. Nail 8 securing PVC cap 6 in place. An eye hook 10 is secured to the outside of PVC cap 6 and is used to suspend the present invention from a ceiling hook, rope, or other item used to hang a plant.

An eye hook 12 would be attached to nail 8, with eye hook 12 being located within tube 4. A spring 14 would have two ends, a first end and a second end, with the first end of spring 14 being suspended from eye hook 12. The second end of spring 14 would be connected to eye hook 16, which would be fastened to the first end of readout 2.

Metal bar 18 has two ends, a first end and a second end, with the first end of metal bar 18 being attached to eye hook 20, which would be attached to the second end of readout 2. Housing 19 is mounted over the first couple inches of the second end of tube 4, while PVC cap 22 would be placed over housing 19 on the second end of tube 4, with the second end of metal bar 18 extending through PVC cap 22. Eye hook 24 would be located at the second end of metal bar 18.

The present invention would be configured such that some or all of the green portion of readout 2 would be showing from the bottom of the present invention when a plant would have just been watered. In this position, the red portion of readout 2 would not be visible and would be hidden behind housing 19. However, once the hanging plant would lose water to evaporation and use by the plant, the tension on spring 14 would lessen, allowing the green portion to disappear behind housing 19 and/or PVC cap 22, while the red portion of readout 2 would become visible through tube 4 above housing 19. The visibility of the red portion of readout 2 would indicate to a user that the plant was low on water and need to be watered.

Figure 2:
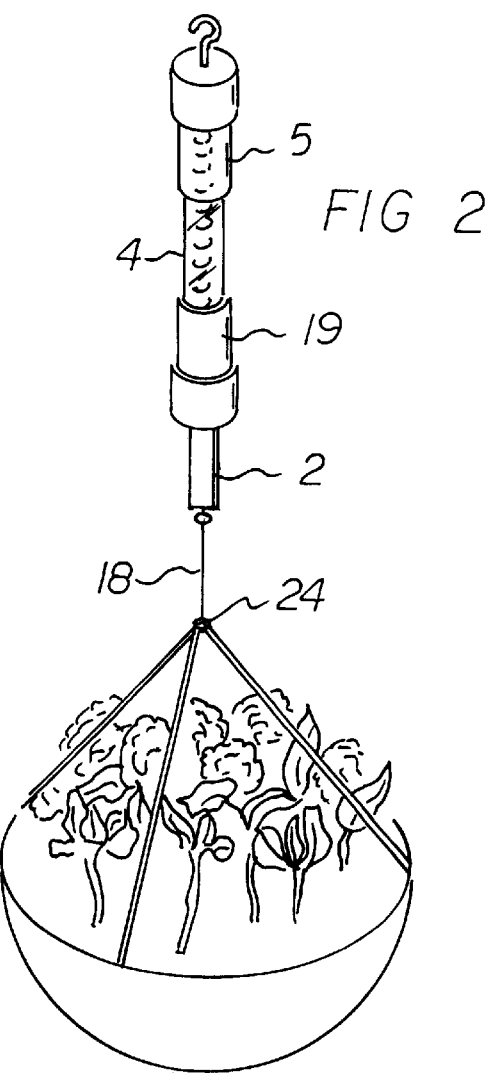
FIG. 2 shows the present invention in use.

FIG. 2 shows the present invention in use. As can be seen, a plant would be hung from eye hook 24.

What I claim as my invention is:

1. An apparatus for notifying individuals to water a houseplant in combination with a houseplant and houseplant container comprising:

(a) a central tube having two ends, an upper end and a lower end, the central tube being transparent, (b) an upper housing having two ends, a first end and a second end, the first end of the upper housing being placed on the upper end of the central tube, (c) an upper cap placed over the second end of the upper housing, the upper cap having a top (d) a first fastening means for attaching the upper cap to the upper housing, (e) a first eye hook attached to the top of the upper cap, the first eye hook removably attached to a ceiling surface, (f) a lower housing having two ends, a first end and a second end, the first end of the lower housing being placed on the lower end of the central tube, (g) a lower cap placed over the second end of the lower housing, (h) a second fastening means for attaching the lower cap to the lower housing, (i) a second eye hook having two ends, a first end and a second end, the first end attached to the first fastening means, (j) a spring having two ends, a first end and a second end, the first end of the spring being attached to the second end of the second eye hook, the spring having a specific tension strength, (k) a third eye hook having two ends, a first end and a second end, the first end of the third eye hook attached to the second end of the spring, (l) an indicator readout bar having two ends, a first end and a second end, the indicator readout bar having a length of approximately six inches, the first end of the indicator readout bar attached to the second end of the third eye hook, (m) a metal bar having two ends, a first end and a second end, the first end of the metal bar being attached to the second end of the indicator readout bar, (n) a fourth eye hook having two ends, a first end and a second end, the first end of the fourth eye hook attached to the metal bar, and the second end of the fourth eye hook being attached to the houseplant container, (o) wherein the tension in the spring would be such as to have the indicator readout bar not be viewable when the houseplant in the houseplant container has been sufficiently water, and further wherein the indicator readout bar would be viewable when the houseplant in the houseplant container would not be sufficiently watered.

2. An apparatus for notifying individuals to water a houseplant in combination with a houseplant and houseplant container according to claim 1 wherein the first fastening means for attaching the upper cap to the upper housing would comprise at least one nail, the nail being inserted through the upper cap and the upper housing.

3. An apparatus for notifying individuals to water a houseplant in combination with a houseplant and houseplant container according to claim 1 wherein the second fastening means for attaching the lower cap to the lower housing would comprise at least one nail, the nail being inserted through the lower cap and the lower housing.

4. An apparatus for notifying individuals to water a houseplant in combination with a houseplant and houseplant container according to claim 1 wherein the upper half of the indicator readout bar would be red and the lower half of the indicator readout bar would be green.

* * * * *